(12) United States Patent
Dimitri et al.

(10) Patent No.: US 6,243,332 B1
(45) Date of Patent: Jun. 5, 2001

(54) INPUT/OUTPUT PERISCOPE STATION FOR LIBRARIES

(75) Inventors: Kamal Emile Dimitri; Jerry Walter Hammar, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,234

(22) Filed: Sep. 11, 1998

(51) Int. Cl.[7] .................................................. G11B 17/22
(52) U.S. Cl. .............................. 369/34; 369/36; 414/273
(58) Field of Search .................................. 369/34, 36, 37, 369/38, 39, 178; 360/92, 71; 414/273, 277, 744.2, 744.3; 901/40

(56) References Cited

U.S. PATENT DOCUMENTS

| | | | |
|---|---|---|---|
| 4,846,619 | * | 7/1989 | Crabtree et al. ............... 414/273 |
| 4,864,511 | | 9/1989 | Moy et al. . |
| 4,928,245 | | 5/1990 | Moy et al. . |
| 4,932,826 | | 6/1990 | Moy et al. . |
| 4,945,429 | | 7/1990 | Munro et al. . |
| 5,143,193 | * | 9/1992 | Geraci ........................... 194/212 |
| 5,336,030 | | 8/1994 | Ostwald et al. . |
| 5,471,445 | * | 11/1995 | Emberty et al. ................ 369/34 |
| 5,479,581 | | 12/1995 | Kleinschnitz . |
| 5,567,512 | | 10/1996 | Chen et al. . |
| 5,570,337 | | 10/1996 | Dang . |
| 5,601,391 | | 2/1997 | Gazza . |
| 5,607,275 | | 3/1997 | Woodruff et al. . |
| 5,610,882 | | 3/1997 | Dang . |
| 5,631,785 | | 5/1997 | Dang et al. . |
| 5,646,918 | * | 7/1997 | Dimitri et al. ................ 369/34 |
| 5,659,440 | | 8/1997 | Acosta et al. . |
| 5,659,444 | | 8/1997 | Dang et al. . |
| 5,666,337 | | 9/1997 | Dang et al. . |
| 5,680,377 | | 10/1997 | Dang et al. . |
| 5,761,161 | | 6/1998 | Gallo et al. . |

FOREIGN PATENT DOCUMENTS 5-250827   9/1993   (JP) .

* cited by examiner

*Primary Examiner*—Tan Dinh
(74) *Attorney, Agent, or Firm*—Altera Law Group, LLC

(57) ABSTRACT

An Input/Output periscope station for automated storage and retrieval systems is disclosed. The periscoping I/O station provides a push down action after a cartridge is imported or exported and which can be used to automatically exchange cartridges with adjacent libraries. The periscoping I/O station includes a periscope arm, a first motor for moving the periscope arm along a first axis, a second motor for rotating the periscope arm about an axis of rotation, a cartridge supporter comprising a plurality of slots for holding a corresponding plurality of cartridges and a mounting fixture for mounting the periscope arm to a library. The system further includes LED sensors for monitoring when a cartridge is being inserted in or retrieved from the plurality of slots of the cartridge support, or when a cartridge is stuck. The first and second motors position the cartridge supporter for exchanging cartridges with robots such that cartridges may be exchanged with libraries that are mounted back-to-back and/or side-to-side. A guiding mechanism is provided for guiding the cartridge supporter when being lowered into the library.

32 Claims, 4 Drawing Sheets

INPUT/OUTPUT PERISCOPE STATION FOR LIBRARIES

BACKGROUND OF THE INVENTION

1. Field of the Invention

This invention relates in general to automated storage and retrieval systems, and more particularly to an input/output periscope station for automated storage and retrieval systems.

2. Description of the Related Art

In an automated information storage and retrieval system, also known as an automated library, numerous slots, or storage cells, are arrayed within the library. These storage cells are used to hold information media that are portable or removable from the library, such as magnetic tape cartridges or optical disks. The term "cartridge" used herein refers to any retaining structure for such removable information media. Although the present invention is described herein with respect to a magnetic tape library storing tape cartridges, it is not so limited but is equally applicable, for example, to an optical library holding optical disk cartridges, cartridge-less optical disks, optical tape cartridges, even magnetic disk cartridges or diskettes, and the like. The storage cells typically have an opening in the front to allow the cartridge to be inserted or removed.

A library typically includes a controller, an accessor, a drive, and an Input/Output station. The library controller directs the actions of the other library components. The library controller can also connect to a host processor and respond to control commands from the host processor. The library controller inventories the storage cells noting the identity of each cartridge occupying a storage cell. If no cartridge is situated in a particular storage cell, the library controller records this storage cell as empty. Typically, each cartridge has a unique identifying mark, such as a bar code label, on an edge of the cartridge visible through the cell opening.

The accessor transports a selected cartridge between its origin and its destination. A storage cell, a drive, and the Input/Output station serve as origins and/or destinations. The accessor grips the cartridge with a holding device. The accessor may also be equipped with a vision system, such as a bar code reader, to read the label on a storage cell when the accessor is positioned near the storage cell. During an inventory of the library, such as when a new library has been installed, the vision system scans the cells and reports to the library controller the identity of stored cartridges and their location within the array of storage cells. The library controller records the identity and location information in a database. The library controller later refers to and updates this database when a cartridge is moved between an origin and a destination. In this sense, the library controller must "know" the identity of each cartridge and its location within the array of cells in order to be able to retrieve the cartridge for access.

Libraries also have one or more drives to read data from a tape cartridge or write data to a tape cartridge. The accessor removes a selected tape cartridge from a storage cell and inserts it into the drive. Once in the drive, data can be read from the tape cartridge and sent to the host processor. In some library configurations, the data is sent to the host processor through the library controller. Whereas, in other library configurations the data is transferred directly from the drive to the host processor. In this latter configuration, the library controller sends a response to the host processor indicating the selected cartridge is placed in the drive. The host processor then issues a command to the drive to transfer the data. Likewise, data can be written from the host processor to the drive in either library configuration. In both configurations, the library controller directs the accessor to load the selected cartridge into the drive before the data is written to the cartridge.

Libraries also typically include an Input/Output station and an operator panel. The Input/Output station is a port through which a system operator can pass a cartridge to be added to the storage array or through which the accessor can pass a cartridge to the operator for removal from the storage array. The operator panel provides a communication mechanism for an operator to make requests to add cartridges to the library or remove cartridges from the library. The Input/Output station allows the operator to change cartridges in the storage array without requiring the library controller to inventory the entire storage array. Typically, an inventory must be taken each time a library access door is opened by the operator since it is not known whether the operator has added cartridges to the array, has removed cartridges from the library, or has not altered the contents of the library at all. The term library access door refers to a door in the library large enough to allow the operator to manually insert or remove cartridges into the storage cells of the storage array. The library access door does not refer to a door which provides the operator access to the Input/Output station.

As stated before, an inventory of the library may require the vision system of the accessor to scan all the storage cells in the storage array and report to the library controller the identity of stored cartridges and their location within the array of storage cells. If a cartridge label cannot be detected or read when the accessor is near a storage cell, that cell is recorded as empty. The vision system may also mistakenly classify a cell as being empty when, in fact, the cell is actually occupied. For example, a cartridge may occupy the cell but have an unreadable label, or even no label. A cartridge may be improperly oriented within the cell or a foreign object may occupy the cell. If the accessor attempts to insert a cartridge into such an occupied cell, an error condition will result causing a time consuming error recovery procedure to be initiated.

One known error procedure attempts to reduce such non-empty errors by directing the accessor's gripper to attempt to reach inside every cell which does not have an identifiable cartridge and verify by "touch" that the cell is actually empty. Any cell which is still not found to be empty is classified in the database as having an "occupied but invalid" status to prevent its use. An inventory of a 400 cell library, for example, can take three or four hours to complete using this procedure.

The Input/Output station saves time and increases the overall performance of the library. Instead of requiring an operator to manually insert or remove cartridges to or from the storage cells, an operator can use the Input/Output station. The accessor then transports a cartridge to or from the storage cell within the storage array. Additionally, the accessor can transport cartridges directly to the drive from the Input/Output station. The vision system in the accessor automatically reads the label on the cartridge. The library controller then adds the identity and location of the cartridge to the inventory database. Without the Input/Output station, an operator would have to open a library access door to simply add or remove a single cartridge. The opening of the library access door would cause the library to inventory the entire storage array when its contents would have only changed by a single cartridge.

The Input/Output station can still prevent the library from achieving its highest level of performance. An Input/Output station design that interferes with the path of the accessor would require the accessor to be paused any time the Input/Output station was used. Pausing the accessor causes the automated processes within the library to be suspended during use of the Input/Output station. Suspension of these automated processes in turn slows down the library performance. Alternatively, some current Input/Output station designs do not interfere with the path of the accessor. Typically, these Input/Output stations are located in the front panel of the library and use a rotary mechanism to pass a cartridge from the exterior to the interior of the library. The Input/Output station pivots the cartridge 180 degrees such that the cartridge label faces both the operator and the accessor when either is handling the cartridge. This Input/Output station design requires the accessor to pivot. This pivoting motion can slow down the performance of the accessor when transporting the cartridge to a storage cell within the storage array.

In addition, new libraries are being developed which are relatively small in size. An Input/Output station located in the front panel of the library is inconveniently low for an operator. An Input/Output station which allows the operator to insert cartridges into or remove cartridges from the top surface is much more convenient in smaller libraries. Also, an Input/Output station which does not require the accessor to pivot can decrease the time to transport the cartridge between the Input/Output station and the storage array and increase the overall performance of the library.

Existing libraries have their I/O station slanted and require a push down action after a cartridge is imported or exported. This I/O station cannot be used by other robots or autochangers to automatically exchange cartridges from their shelves into the this type of library. Today there are robots that use an old style optical library I/O station to import and export cartridges, and the library I/O station is horizontal and does not require a close down action after cartridge insertion.

It can be seen then that there is a need for a periscoping I/O station that provides a push down action after a cartridge is imported or exported.

It can also be seen then that there is a need for a periscoping I/O station that can be used to automatically exchange cartridges with adjacent libraries.

SUMMARY OF THE INVENTION

To overcome the limitations in the prior art described above, and to overcome other limitations that will become apparent upon reading and understanding the present specification, the present invention discloses an Input/Output periscope station for automated storage and retrieval systems.

The present invention solves the above-described problems by providing a periscoping I/O station that provides a push down action after a cartridge is imported or exported and can be used to automatically exchange cartridges with adjacent libraries.

A system in accordance with the principles of the present invention includes a periscope arm, a first motor, operatively coupled to the periscope arm, for moving the periscope arm along a first axis, a second motor, operatively coupled to the periscope arm, for rotating the periscope arm about an axis of rotation, a cartridge supporter, coupled to the periscope arm, the cartridge supporter comprising a plurality of slots for holding a corresponding plurality of cartridges and a mounting fixture, coupled to the periscope arm, for mounting the periscope arm to a library.

Other embodiments of a system in accordance with the principles of the invention may include alternative or optional additional aspects. One such aspect of the present invention is that the mounting fixture is mounted to a back of an existing library.

Another aspect of the present invention is that the cartridge supporter comprises four slots for holding four cartridges.

Another aspect of the present invention is that the system further includes electronic motor driver circuits for controlling the operation of the first and second motors.

Another aspect of the present invention is that the system further includes LED sensors for monitoring when a cartridge is being inserted in or retrieved from the plurality of slots of the cartridge support.

Another aspect of the present invention is that the LED sensors further detect a cartridge being stuck using sense commands of the library.

Another aspect of the present invention is that the first and second motors position the cartridge supporter for exchanging cartridges with robots.

Another aspect of the present invention is that the first and second motors position the cartridge supporter for exchanging cartridges with libraries that are mounted back-to-back.

Another aspect of the present invention is that the first and second motors position the cartridge supporter for exchanging cartridges with libraries that are mounted side-to-side.

Another aspect of the present invention is that the system further includes a guiding mechanism for guiding the cartridge supporter when being lowered into the library.

Another aspect of the present invention is that the axis of rotation aligned with the first axis.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an Input/Output periscope station for automated storage and retrieval systems. The periscoping I/O that provides a push down action after a cartridge is imported or exported and can be used to automatically exchange cartridges with adjacent libraries.

Figure 1:
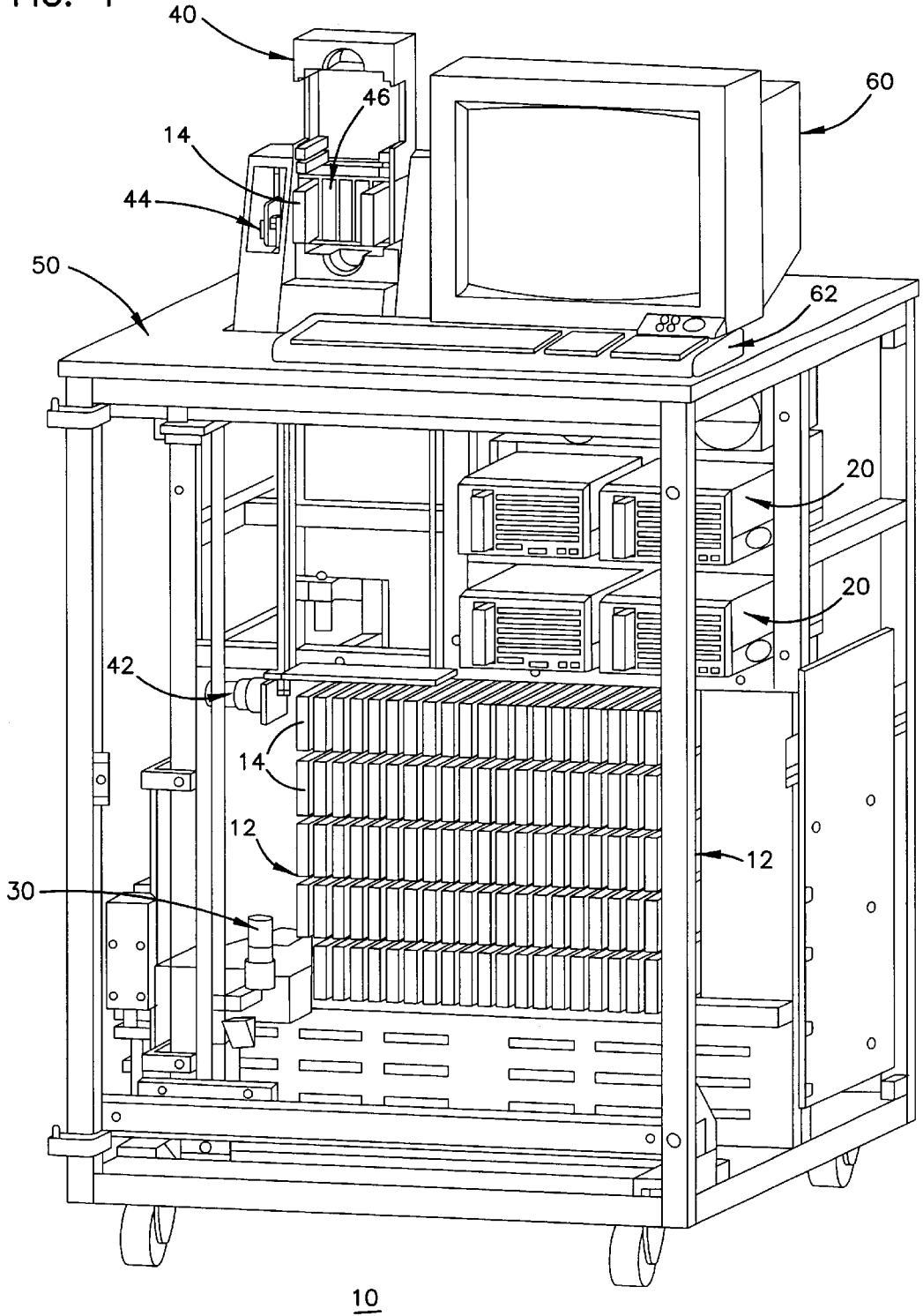
FIG. 1 is a front view of a conventional magnetic tape library with the front, rear and side panels removed.
Figure 2:
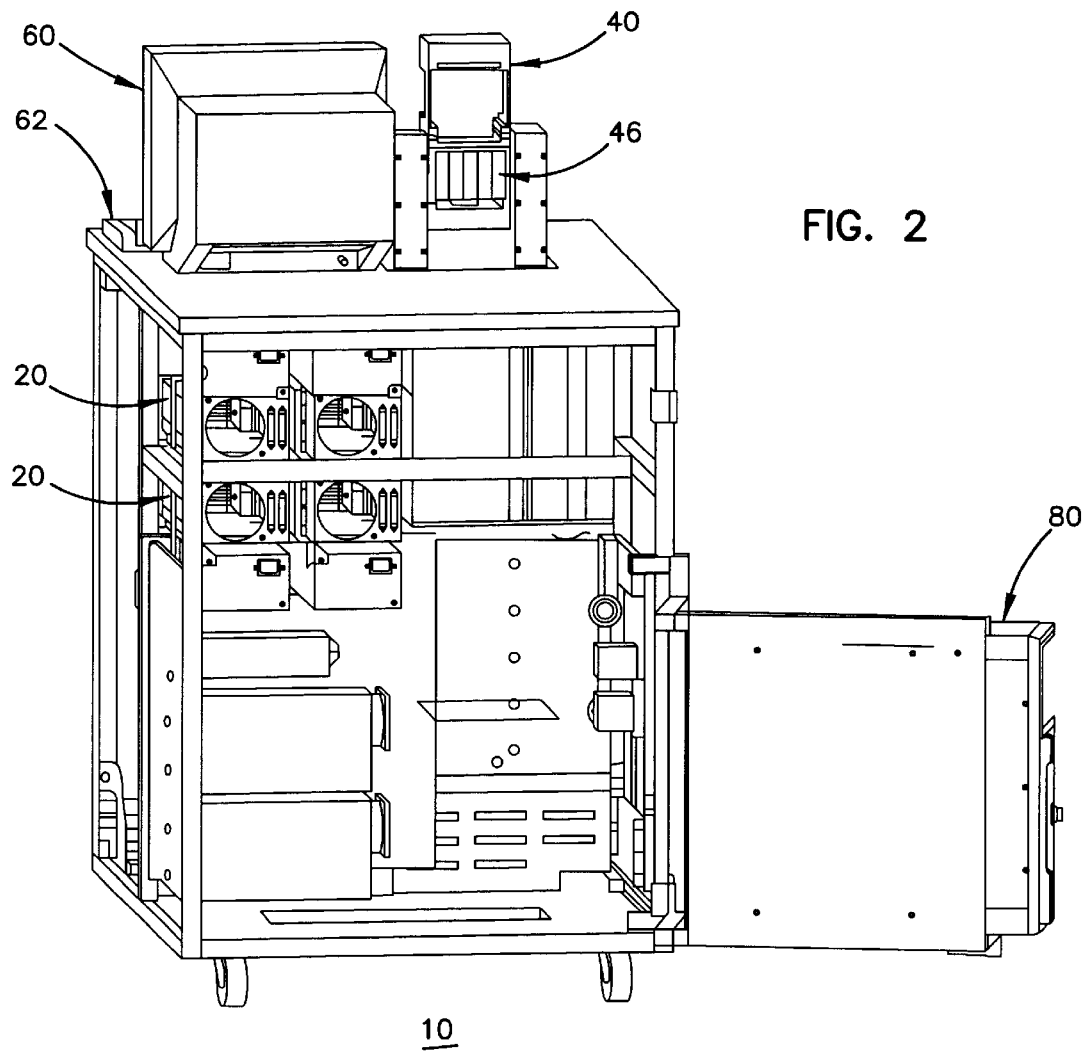
FIG. 2 is a rear view of the conventional magnetic tape library of FIG. 1 with the front, rear and side panels removed.

FIG. 1 is a front view of a conventional magnetic tape library 10 with the front, rear and side panels removed. FIG. 2 is a rear view of the conventional magnetic tape library 10 of FIG. 1 with the front, rear and side panels removed. The conventional magnetic tape library 10 is illustrated having a vertical elevator mechanism or Input/Output station 40. The library 10 also includes an array of storage cells 12 for holding magnetic tape cartridges 14. The array of storage cells 12 is arranged in rows and columns on an interior wall of the library 10. An accessor 30 transports a selected cartridge 14 between a storage cell 12 and a tape drive unit 20. The accessor 30 includes a gripper for holding the cartridge and a vision system for reading a bar code to identify the cartridge. The accessor 30 is capable of motion in the X and Y axes. The accessor's 30 gripper provides motion in the Z direction, but does not pivot to insert and remove cartridges from the tape drives 20, the storage cells 12 in the storage array, or the Input/Output station 40.

The library 10 contains a tape drive 20 for reading data from or writing data to a cartridge 14. Typically, a library I/O includes more than one tape drive unit 20 and four are shown in FIGS. 1 and 2. As mentioned above, the library 10 also contains an Input/Output station 40 for allowing an operator to add or remove cartridges 14 from the storage array 12. The Input/Output station 40 uses an elevator mechanism to move cartridges 14 between a position above the top surface 50 of the library 10 to one internal to the library 10. A motor 42 and a pulley 44 raise and lower the elevator mechanism 40. The Input/Output station 40 can hold one or more magazines 46, each capable of holding five cartridges 14.

The Input/Output station 40 allows an operator to add or remove cartridges 14 to the library 10 without opening a locking front door (not shown). However, an operator can still manually load or unload cartridges 14 through the locking front door. If such action is taken, the library 10 must conduct an inventory of the entire storage array 12 after the front door is closed and locked. An operator may also need to access the interior of the library 10 to service the accessor 30, the drive 20, or other components. The manual loading of tape cartridges is typically done during the installation of a new library.

A terminal 60 and a keyboard 62 are included on the top surface 50 of the library 10 to allow an operator to communicate with a library controller 80 located in the rear portion of the library 10. The library controller 80 uses a microprocessor with control instructions in its control storage to direct the operation of the accessor 30, the drive 20, and the Input/Output station 40. The library controller 80 also interfaces with a host processor (not shown) and controls the transfer of data between the host processor and the drive 20.

Figure 3:
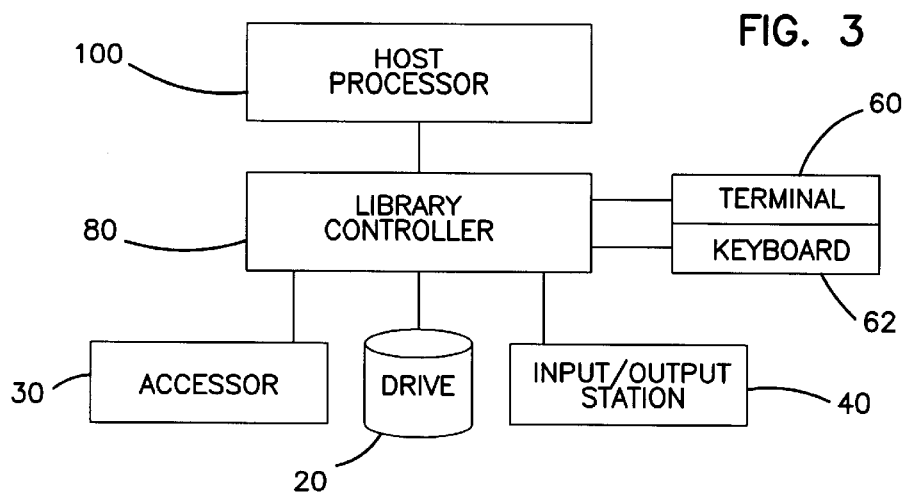
FIG. 3 shows a high level block diagram of a library as shown in FIGS. 1 and 2.

FIG. 3 shows a high level block diagram of a library 10 as shown in FIGS. 1 and 2. Each block represents a major component of the library 10. The connections of the blocks represents the configuration of the library. A host processor 100 is connected to the library controller 80. The library controller 80 connects to the accessor 30, the drive 20, the Input/Output station 40, and the terminal 60 and keyboard 62 comprising the operator panel.

The Input/Output station of the present invention can be used with libraries having other configurations than the one just described in FIGS. 1 and 2. The description of the library illustrated in FIGS. 1 and 2 is not meant to be limiting.

Figure 4:
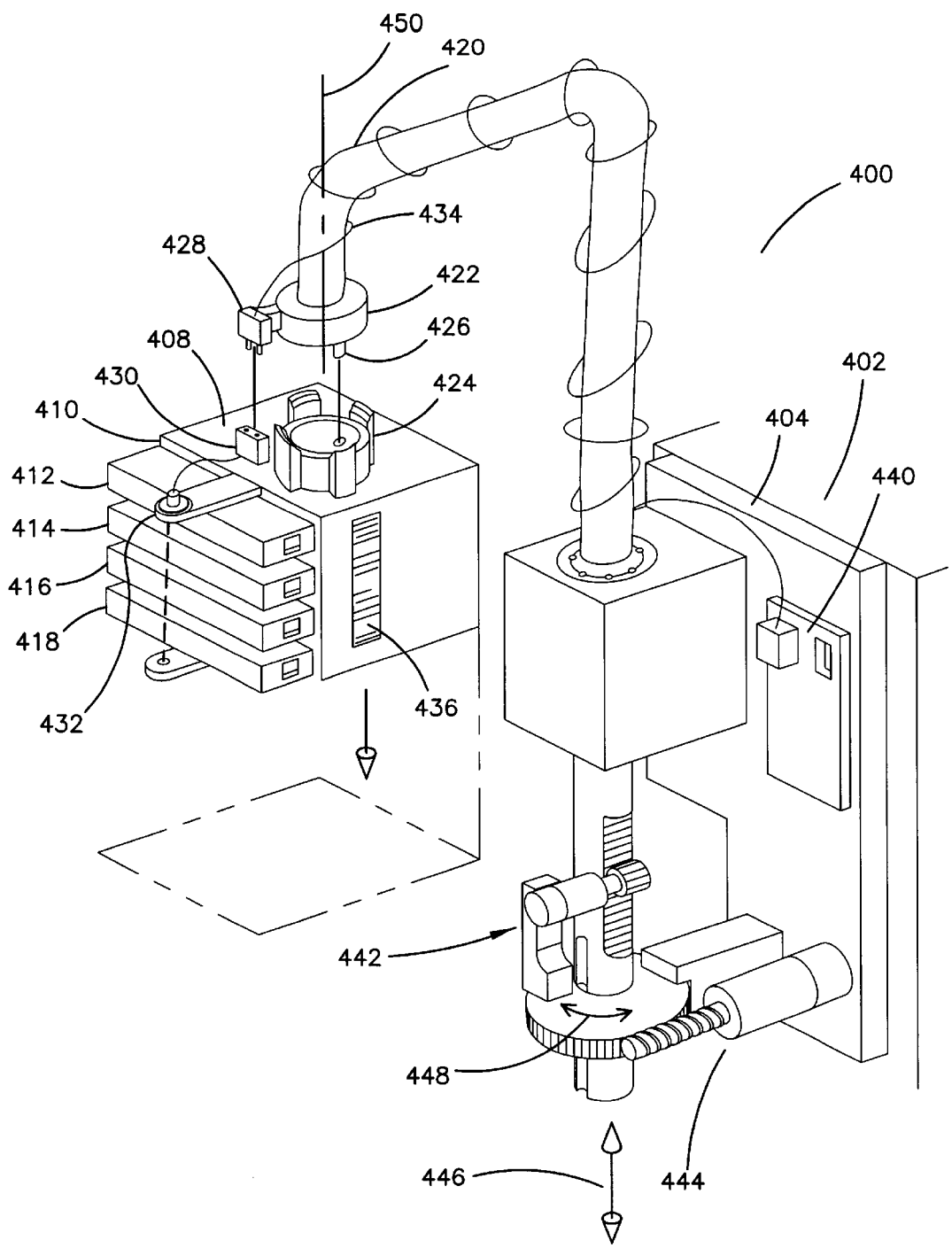
FIG. 4 illustrates a periscope I/O station according to the present invention.

FIG. 4 illustrates a periscope I/O station 400 according to the present invention. FIG. 4 illustrates how the Periscope I/O (PIO) 400 can be added to the back of an existing library 402 via a mounting fixture 404 with minimal modification.

In FIG. 4 the PIO 400 has a cartridge supporter or magazine 408 containing, for example, 4 slots 410 for holding four cartridges 412–418. However, those skilled in the art will recognize that the invention is not meant to be limited by the number of slots. Other configurations with a wide variety in the number of slots are possible.

The magazine 408 is attached to arm 420 via a magnetic chuck mechanism 422. The magnetic chuck mechanism 422 engages a locking mechanism 424 and is aligned with the magazine 408 via a guide pin 426 so that connector 428 engages with connector 430 to close a circuit between the LED sensors 432 and the umbilical signal cable 434. The LED sensors 432 monitor when a cartridge 412–418 is being inserted or retrieved, or stuck using the sense commands of the library. The arm 420 is preferably a cylindrical rod. The magazine 408 includes bar codes 436 for identifying the magazine 408 and for tracking the location of the magazine 408.

The PIO unit 400 is self contained with its own electronic motor driver circuits 440. The umbilical cable 434 plugs into the library autochanger (A/C) board (not shown) which controls the movement of the PIO unit 400. The autochanger uses the PIO 400 as its regular I/O. The autochanger may command the PIO 400 to move from location X, where X is the home base element number, to location Y, where Y is the pop-up location of the periscope. To accomplish this movement, a first motor 442 is activated and moves the PIO 400 along the axis 446. Similarly, the autochanger may activate the first motor 442 to move the PIO 400 from position Y to position X.

The second motor 4444 can move the PIO 400 from a position Y to a position Z by swiveling the PIO 400 180 degrees (clockwise) about the axis 446. Similarly, the second motor 444 may move the PIO 400 from a position Z to a position Y by swiveling the PIO 400 180 degrees (counterclockwise) about the axis 446. Preferably the axis of rotation 448 is parallel to axis 450.

Figure 5A:
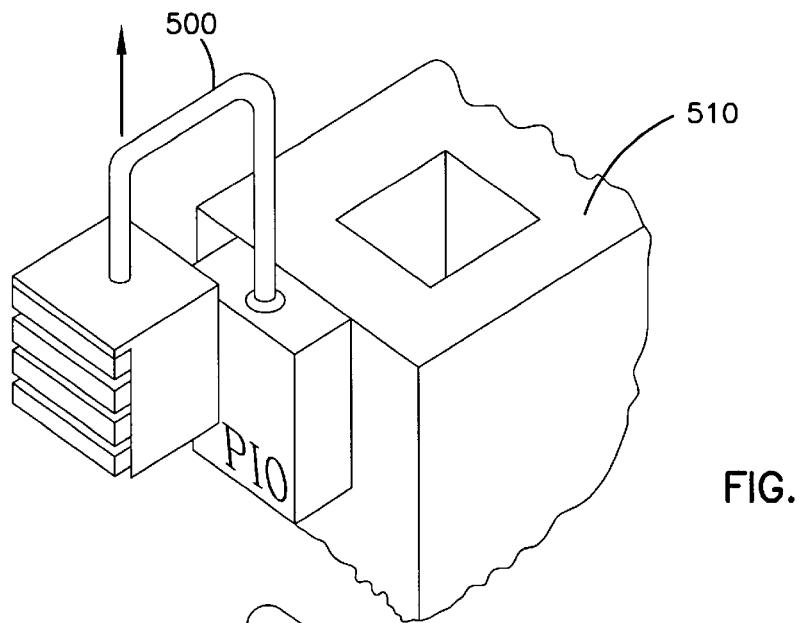
FIGS. 5a–c illustrate the periscoping I/O station being attached to a library.
Figure 5B:
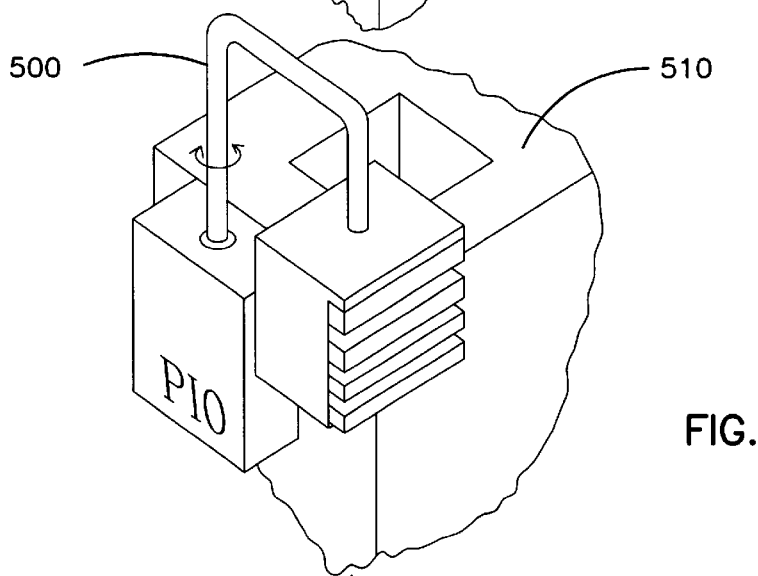
Figure 5C:
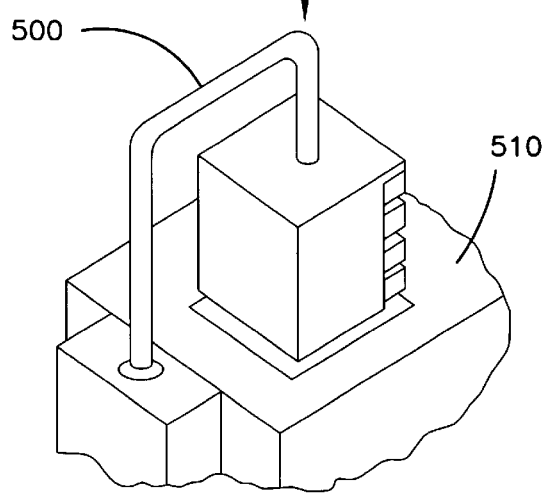

FIGS. 5a–c illustrate the PIO 500 being attached to a library 510. For simplicity and clarity of explanation, some structural details of the PIO 500 are not illustrated in FIGS. 5a–c, e.g., the magnetic chuck mechanism.

In FIG. 5a, the PIO 500 is illustrated in a position where cartridges may be exchanged. Thus, the PIO 500 can be used in exchanging cartridges from one library to another when installed back to back, having the PIO 500 sandwiched between both libraries.

In FIG. 5b, the PIO 500 is shown positioned for side-to-side exchange. Thus, another application of the PIO 500 can be derived if a bank of libraries are mounted side by side. For this type of exchange, the second motor rotates the magazine bins for a side to side exchange by swiveling the PIO 500 only 90 degrees.

FIG. 5c illustrates the PIO 500 being guided into a library. The PIO 500 includes a lead-in or a ramp so that it can be guided when lowered into the library. The PIO 500 can serve multiple bins.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A Input/Output station for a library of an automated storage and retrieval system, comprising:
    a periscope arm;
    a first motor, operatively coupled to the periscope arm, for moving the periscope arm along a first axis;
    a second motor, operatively coupled to the periscope arm, for rotating the periscope arm about an axis of rotation;
    a cartridge supporter, coupled to the periscope arm, the cartridge supporter comprising a plurality of slots for holding a corresponding plurality of cartridges; and
    a mounting fixture, coupled to the periscope arm, for mounting the periscope arm to a library.

2. The Input/Output station of claim 1 wherein the mounting fixture is mounted to a back of an existing library.

3. The Input/Output station of claim 1 wherein the cartridge supporter comprises four slots for holding four cartridges.

4. The Input/Output station of claim 1 further comprising electronic motor driver circuits for controlling the operation of the first and second motors.

5. The Input/Output station of claim 1 wherein the cartridge supporter further comprises LED sensors for monitoring when a cartridge is being inserted in or retrieved from the plurality of slots of the cartridge support.

6. The Input/Output station of claim 5 wherein the LED sensors further detect a cartridge being stuck using sense commands of the library.

7. The Input/Output station of claim 1 wherein the first and second motors position the cartridge supporter for exchanging cartridges with robots.

8. The Input/Output station of claim 7 wherein the first and second motors position the cartridge supporter for exchanging cartridges with libraries that are mounted back-to-back.

9. The Input/Output station of claim 8 wherein the first and second motors position the cartridge supporter for exchanging cartridges with libraries that are mounted side-to-side.

10. The Input/Output station of claim 7 wherein the first and second motors position the cartridge supporter for exchanging cartridges with libraries that are mounted side-to-side.

11. The Input/Output station of claim 1 further comprising a guiding mechanism for guiding the cartridge supporter when being lowered into the library.

12. The Input/Output station of claim 1 wherein the axis of rotation aligned with the first axis.

13. The Input/Output station of claim 1 further comprising a coupler for removably coupling the cartridge supporter to the periscope arm.

14. The Input/Output station of claim 13 wherein the coupler comprises a magnetic chuck mechanism.

15. The Input/Output station of claim 14 wherein the coupler further comprises a guide pin for aligning the magnetic chuck mechanism with a connector on the cartridge supporter.

16. The Input/Output station of claim 1 wherein the cartridge supporter comprises bar codes for identifying the cartridge supporter thereby enabling tracking of a location for the cartridge supporter.

17. An automated library for storing and retrieving removable information storage elements comprising:
    an array of storage cells for storing the information storage elements, each said storage cell having a front opening for inserting and removing information storage elements;
    an Input/Output station for inserting and removing said information storage elements from said automated library;
    a drive for reading information from said information storage element, said drive having a drive opening for loading and unloading said information storage element;
    an accessor for gripping said information storage element, said accessor further transporting said information storage element between said storage cells, said Input/Output station, and said drive; and
    a controller interconnected to said accessor, said drive, and a host processor, said controller receiving control instructions from said host processor and directing actions to said accessor and said drive in response to said control instructions,
    wherein said Input/Output station further comprises
       a periscope arm;
       a first motor, operatively coupled to the periscope arm, for moving the periscope arm along a first axis;
       a second motor, operatively coupled to the periscope arm, for rotating the periscope arm about an axis of rotation;
       an information storage element supporter, coupled to the periscope arm, the information storage element supporter comprising a plurality of slots for holding a corresponding plurality of information storage elements; and
       a mounting fixture, coupled to the periscope arm, for mounting the periscope arm to a library.

18. The automated library of claim 17 wherein the mounting fixture is mounted to a back of the library.

19. The automated library of claim 17 wherein the information storage element supporter comprises four slots for holding four information storage elements.

20. The automated library of claim 17 further comprising electronic motor driver circuits for controlling the operation of the first and second motors.

21. The automated library of claim 17 wherein the information storage element supporter further comprises LED sensors for monitoring when information storage elements are being inserted in or retrieved from the plurality of slots of the information storage element supporter.

22. The automated library of claim 21 wherein the LED sensors further detect an information storage element being stuck using sense commands of the library.

23. The automated library of claim 17 wherein the first and second motors position the information storage element supporter for exchanging information storage elements with robots.

24. The automated library of claim 23 wherein the first and second motors position the information storage element supporter for exchanging information storage elements with libraries that are mounted back-to-back.

25. The automated library of claim 24 wherein the first and second motors position the information storage element supporter for exchanging information storage elements with libraries that are mounted side-to-side.

26. The automated library of claim 23 wherein the first and second motors position the information storage element supporter for exchanging information storage elements with libraries that are mounted side-to-side.

27. The automated library of claim 17 further comprising a guiding mechanism for guiding the information storage element supporter when being lowered into the library.

28. The automated library of claim 17 wherein the axis of rotation is aligned with the first axis.

29. The automated library of claim 17 further comprising a coupler for removably coupling the cartridge supporter to the periscope arm.

30. The automated library of claim 29 wherein the coupler comprises a magnetic chuck mechanism.

31. The automated library of claim 30 wherein the coupler further comprises a guide pin for aligning the magnetic chuck mechanism with a connector on the cartridge supporter.

32. The automated library of claim 17 wherein the cartridge supporter comprises bar codes for identifying the cartridge supporter thereby enabling tracking of a location for the cartridge supporter.

* * * * *

UNITED STATES PATENT AND TRADEMARK OFFICE
CERTIFICATE OF CORRECTION

PATENT NO. : 6,243,332 B1
DATED : June 5, 2001
INVENTOR(S) : Dimitri et al.

It is certified that error appears in the above-identified patent and that said Letters Patent is hereby corrected as shown below:

<u>Column 6,</u>
Line 42, replace "4444" with -- 444 --

Signed and Sealed this

Seventh Day of May, 2002

*Attest:*

JAMES E. ROGAN
*Director of the United States Patent and Trademark Office*

*Attesting Officer*